UNITED STATES PATENT OFFICE 2,626,251

WATER SOLUBLE CATIONIC RESINS

Raymond W. James, Lexington, and Wilbur B. Pings, Cohasset, Mass., assignors, by mesne assignments, to Imperial Paper and Color Corporation, Glens Falls, N. Y., a corporation of New York No Drawing. Application August 25, 1948, Serial No. 46,191

7 Claims. (Cl. 260—70)

This invention relates to resins and has for its object the provision of water soluble cationic urea aldehyde resins, and a method of preparing the resins. The improved resins of the invention have several important characteristics and in addition to being water soluble and cationic they are thermosetting and can be cured to a water-insoluble form without the addition of a curing catalyst.

A method of forming the resins of the invention comprises reacting urea and its homologues, an aldehyde and a water soluble compound containing a trivalent nitrogen atom capable of forming an acid salt which contains an active hydrogen group capable of condensing with an OH group present in the aldehyde-urea condensate. The resulting condensate is strongly acidified to produce a water soluble resin that is cationic, and the solution is buffered back (neutralized) to a higher pH, preferably around pH 6, but not over pH 7.

While other carbamides may be used, such as thiourea, guanidine, di-cyandiamide and the like, urea is the preferred compound. Aldehydes other than formaldehyde include acetaldehyde, and mixtures of these. In the production of most of the resins within the scope of this invention formaldehyde is the preferred aldehyde. This includes its polymeric forms, e. g., paraformaldehyde which yields formaldehyde under the conditions prevailing in the reaction.

The amines employed in accordance with the invention include all those water soluble compounds containing a trivalent nitrogen atom with an active hydrogen. They include such compounds as ammonia, methyl and dimethylamines, ethyl and diethyl amines, propyl and dipropyl amines and the mono- and di-butyl amines; also alkanol amines such as mono- and diethanol-amines, and ether amines, such as morpholine. Further, certain water soluble hydroxylated tertiary aliphatic amines, such as triethanolamine and certain water soluble heterocyclic amines, such as pyridine and quinoline may be used in the process.

The ratio of the components in the reaction mixture may be varied over a wide range depending on the properties desired in the final resin.

The ratio of aldehyde to urea is of extreme importance. With urea a minimum of 2 mols of aldehyde per mol of urea is necessary for the production of stable, water soluble resins. For certain applications where greater stability and less reactivity is desired, the aldehyde may be increased to as much as 3 mols. In practice it is desirable to keep the aldehyde as low as possible to avoid excessive curing times.

The amount of amine used is also of importance. A minimum of ⅓ mol of amine per mol of urea has been found necessary. Greater amounts increase the stability of the resin, but decrease the reactivity. This varies to some degree with the amine used, a much wider latitude existing with ammonia than with triethanolamine. The preferred range lies between ⅓ and ½ mol of amine per mol of urea.

The final character of the resin is influenced greatly by the type of amine used. The presence of OH groups, such as in triethanolamine, greatly improves the stability and water solubility of the final product. Primary and secondary aliphatic amines, such as propyl and dipropyl amines, morpholine, etc., produce cationic resins under proper conditions. Tertiary amines, such as tripropylamine, containing no active hydrogen on the nitrogen group do not produce cationic resins. However, tertiary amines containing an active group, such as OH group (triethanolamine), do produce cationic resins. Triethanolamine is the preferred amine for most of the contemplated uses for this resin.

The procedure for making these resins may be divided into two parts: the first consists of forming a resin which is capable of being made cationic, and the second consists in making the resin cationic.

With regard to the first part of the procedure, one convenient method of preparing these resins is to dissolve about one mol of urea in about ½ mol of the nitrogen-containing compound having the active hydrogen (such as triethanolamine) and then adding about 2 mols of formaldehyde in the form of a 40% solution. The mixture is then warmed and refluxed for a few minutes.

In another method, dimethylol urea is first formed by the action of formaldehyde on urea by mixing about one mol of urea with 2 mols of formaldehyde (as formalin) and warming the mixture until a clear solution is obtained. The nitrogen-containing compound having the active hydrogen is then added to the mixture and the whole composition refluxed for a few minutes.

A variation on the second method is to mix the formaldehyde, urea and the nitrogen-containing compound together and reflux with the aid of heat until a clear solution is obtained.

With regard to the second part of the procedure, that of making the above resins cationic, a sufficient amount of a strong inorganic acid is added to reduce the pH below 2.5 and preferably to at least 1.5. Experimentally, the range between 0.5 and 2.5 has been found to be satisfactory. As soon as the acid has been added, the mixture must be immediately brought back to a pH value of 6. Although higher pH values can be used, they are not desirable, particularly above 7, as they tend to retard the cure of the resin. Sodium carbonate has been found to be a useful material for raising the pH value, although other alkalies may be employed.

Employment of inorganic acids in reducing the pH value is essential. Organic acids, such as formic acid, while reducing the pH value to the desired level, do not produce cationic resins, whereas hydrochloric, nitric, sulfuric, sulfamic and phosphoric acids do yield cationic resins.

Addition of a water miscible alcohol has been found to be of benefit in further improving resin stability. Several have been found to be satisfactory, such as methanol, ethanol, and isopropanol, also polyhydric varieties, such as glycerine, and glycols such as ethylene glycol, diethylene glycol and the polyethylene glycols.

The alcohol addition may be made at any point in the reaction but usually it has been found most convenient to include it with the urea and aldehyde at the start. The addition of an alcohol is not essential, however, in the preparation of these resins and in no way contributes to the cationic nature of the completed resin.

In practice, an amount of alcohol ranging between ½ mol and 1 mol per mol of urea has been found to be satisfactory.

The final product may be concentrated under reduced pressure or dried by conventional means, such as drum drying or spray drying. Care must be exercised in conducting these operations to avoid converting the thermo-setting resin to an insoluble condition.

The following examples are for purposes of illustration.

Example 1

75 gms. of urea (1.25 mol), 66 gms. of triethanolamine (0.443 mol) and 40 gms. of isopropyl alcohol (0.66 mol) are mixed and heated to 80° C. in a suitable container equipped with a stirrer, thermometer and reflux condenser. 213 gms. of 37% formalin (2.63 mols formaldehyde) are then added and the mixture refluxed for 15 minutes. After cooling to 25° C. sufficient 6N hydrochloric acid is added to reduce the pH value to 1.5. The pH is then immediately brought to 6.0 with 30% sodium carbonate.

The resinous product resulting from the above is clear, stable and strongly cationic. It is thermosetting and has high solubility in water.

Example 2

75 gms. of urea (1.25 mol), 66 gms. of triethanolamine (0.443 mol) and 213 gms. of 37% formalin (2.63 mols) were mixed in a suitable container equipped with reflux condenser, stirrer, and thermometer, and heated to reflux temperature. The solution was refluxed for twelve minutes after clearing. The solution was then cooled to room temperature and sufficient 6N hydrochloric acid added to bring the pH to 1.4. The pH was then immediately brought to 6 by the addition of 30% sodium carbonate solution.

The resulting product was a clear, stable, strongly cationic, thermosetting resin, capable of infinite dilution with water.

Example 3

75 gms. of urea (1.25 mol), 50.6 gms. ammonium hydroxide (28% NH₃), (0.842 mol), and 223 gms. of 37% formalin (2.75 mols) were mixed together in a suitable container equipped with a reflux condenser, stirrer and thermometer. The solution was heated to reflux temperature and refluxed for 15 minutes. After cooling to 25° C., the pH was reduced to 1.6 by the addition of 6N hydrochloric acid. The pH was then raised to 6.0 by the addition of 30% sodium carbonate. A clear, strongly cationic resin was obtained which was thermosetting.

Example 4

75 gms. of urea (1.25 mol) and 54.4 gms. of morpholine (0.625 mol) were mixed together in a suitable container equipped with reflux condenser, stirrer, and thermometer. The mixture was heated until the urea was dissolved. 203 gms. of 37% formalin (2.50 mols) was then added and the mixture heated to reflux temperature and refluxed for 15 minutes. After cooling to 25° C. the pH was reduced to 1.3 by the addition of 6N hydrochloric acid. The pH was then raised to 6.0 by addition of 30% sodium carbonate solution.

The product was a clear, stable, strongly cationic, thermosetting resin which was capable of infinite dilution with water.

Example 5

75 gms. of urea (1.25 mol), 63.1 gms. di-N-propylamine (0.622 mol) and 213 gms. of 37% formalin (2.62 mols) were mixed together in a suitable container equipped with stirrer, thermometer and reflux condenser. The mixture was heated to reflux temperature and refluxed for 15 minutes. After cooling to 25° C. the pH was reduced to 1.7 by the addition of 6N hydrochloric acid. The pH was then raised to 6.0 by the addition of 30% sodium carbonate. A clear stable cationic resin was obtained from this procedure.

Example 6

75 gms. of urea (1.25 mol), 66 gms. triethanolamine (0.443 mol), 40 gms. isopropyl alcohol (0.66 mol) and 132 gms. of acetaldehyde (3.0 mols) were mixed together in a suitable container equipped with stirrer, thermometer and reflux condenser. The mixture was heated to 90° C. and stirred at this temperature for 15 minutes.

The pH was then reduced to 1.7 by the addition of 6N hydrochloric acid. The pH was then raised to 6.0 by the addition of 30% sodium carbonate solution. A clear, stable, water soluble cationic resin was obtained from this procedure.

The resins of this invention have unusual properties which make them of value for a wide variety of applications. They are particularly unique in that they can be cured to a completely water insoluble form without the addition of curing catalysts, and yet are extremely stable, retaining their excellent water solubility for indefinite periods when properly formulated.

The high degree of water resistance developed in the cured films of these materials make them particularly suited for textile applications where a high order of washability is desired. In this respect they have proved to be excellent binders for use with pigments in the pigment printing and dyeing of textiles. Other textile uses in which promising results have been obtained include the shrink-proofing of wool and the treatment of cloth to improve its crush-resistance. The cationic nature of the resins make them particularly adaptable to the shrink-proofing of wool as they are strongly attracted to the anionic wool fibre under proper conditions.

These resins are particularly well adapted to the treatment of paper for the preparation of high wet strength papers. Because of their excellent water dilutability they can be added at the wet end of the paper machine, in the beater or head box. Owing to their cationic nature they are compatible with heavy metal salts, particularly chlorides and acetates, and may be used in conjunction with these materials where it has been heretofore impossible to do so with conventional resins.

We claim:

1. A method for preparing water soluble cationic resins which comprises reacting 1 mol of urea with from 2 to 3 mols of an aldehyde selected from the group consisting of formaldehyde and acetaldehyde and with from 1/3 to 2/3 of a mol of a water soluble compound selected from the group consisting of water soluble primary alkyl aliphatic amines, water soluble secondary alkyl aliphatic amines, water soluble unsubstituted hydroxylated aliphatic tertiary amines, and water soluble unsubstituted heterocyclic amines in which the heteroatoms are from the class consisting of a nitrogen atom and a nitrogen atom together with an oxygen atom, subsequently acidifying said reaction mixture to a pH between 0.5–2.5 with a strong inorganic acid, and immediately neutralizing the solution to a pH from 5.0 to 7.0.

2. A method according to claim 1 in which the urea is condensed with from 2 to 3 mols of formaldehyde.

3. A method of preparing water soluble cationic resins which comprises reacting 1 mole of urea with from 2 to 3 mols of an aldehyde selected from the group consisting of formaldehyde and acetaldehyde, reacting the resulting methylol compound with from 1/3 to 2/3 mol of a water soluble compound selected from the group consisting of water soluble primary alkyl aliphatic amines, water soluble secondary alkyl aliphatic amines, water soluble unsubstituted hydroxylated aliphatic tertiary amines, and water soluble unsubstituted heterocyclic amines in which the heteroatoms are from the class consisting of a nitrogen atom and a nitrogen atom together with an oxygen atom, subsequently acidifying said reaction mixture to a pH between 0.5–2.5 with a strong inorganic acid, and immediately neutralizing the solution to a pH from 5.0 to 7.0.

4. As a new composition of matter the resinous product resulting from the method of claim 1.

5. In a method of forming a water soluble cationic resin, the improvement which comprises condensing one mol of urea with from 2 to 3 mols of formaldehyde in the presence of from 1/3 to 2/3 mol of a water soluble unsubstituted hydroxylated aliphatic tertiary amine, subsequently acidifying to a pH between 0.5 and 2.5 with an inorganic acid and immediately neutralizing to a pH from 5.0 to 7.0.

6. A method of forming a water soluble resin which comprises condensing one mol of urea with from 2 to 3 mols of formaldehyde in the presence of from 1/3 to 2/3 mol of triethanolamine and subsequently acidifying the reaction mixture to a pH between 0.5–2.5 with a strong inorganic acid followed by immediate neutralization to a pH from 5.0 to 7.0.

7. As a new composition of matter the resinous product resulting from the method of claim 6.

RAYMOND W. JAMES.
WILBUR B. PINGS.

REFERENCES CITED

The following references are of record in the file of this patent:

UNITED STATES PATENTS

| Number | Name | Date |
| --- | --- | --- |
| Re. 22,828 | Miller | Jan. 14, 1947 |
| 2,119,466 | Michaut | May 31, 1938 |
| 2,245,491 | Menger et al. | June 10, 1941 |
| 2,251,234 | Swain | July 29, 1941 |
| 2,471,188 | Auten | May 24, 1949 |
| 2,485,079 | Wohnsiedler | Oct. 18, 1949 |